United States Patent [19]

Peterson et al.

[11] Patent Number: 5,407,970
[45] Date of Patent: Apr. 18, 1995

[54] RADIATION-CURABLE POLY($\alpha$-OLEFIN) ADHESIVES CONTAINING PENDANT OLEFINIC FUNTIONALITY

[75] Inventors: James R. Peterson, St. Paul; Gaddam N. Babu, Woodbury, both of Minn.

[73] Assignee: Minnesota Mining and Manufacturing Company, St. Paul, Minn.

[21] Appl. No.: 47,148

[22] Filed: Apr. 13, 1993

[51] Int. Cl.$^6$ .................. C08F 2/50; C09J 123/14; C09J 139/04
[52] U.S. Cl. .................. 522/33; 522/40; 522/44; 522/46; 522/47; 522/48; 522/53; 522/63; 522/74; 522/80; 522/110; 522/112; 522/148; 522/149; 522/152
[58] Field of Search .............. 522/110, 112, 157, 158, 522/40, 44, 46, 48, 50, 53, 116, 127, 130, 129, 33, 47, 63, 74, 80, 148, 149, 152

[56] References Cited

U.S. PATENT DOCUMENTS

| | | | |
|---|---|---|---|
| 3,542,717 | 11/1970 | Lipman | 260/27 |
| 3,635,755 | 1/1972 | Balinth et al. | 117/122 |
| 3,954,697 | 5/1976 | McConnell et al. | 526/350 |
| 4,072,812 | 2/1978 | McConnell et al. | 526/348 |
| 4,178,272 | 12/1979 | Meyer et al. | 260/27 |
| 4,259,470 | 3/1981 | Trotter et al. | 526/348 |
| 4,288,358 | 9/1981 | Trotter et al. | 260/31 |
| 5,112,882 | 5/1992 | Babu et al. | 522/158 |
| 5,202,361 | 4/1993 | Zimmerman et al. | 522/158 |

FOREIGN PATENT DOCUMENTS 0003194 7/1979 European Pat. Off. .

OTHER PUBLICATIONS

Odian, G., "Principles of Polymerization", Ch. 8.4, Second Edition, J. Wiley & Sons, New York, 1981 pp. 591–623.

J. Boor, "Ziegler–Natta Catalysts and Polymerizations";, Ch. 19, Academic Press, N.Y. 1979 pp. 512–562.

*Primary Examiner*—Susan W. Berman
*Attorney, Agent, or Firm*—Gary L. Griswold; Walter N. Kirn; David G. Burleson

[57] ABSTRACT

The invention relates to adhesive compositions comprising terpolymers $C_6$ to $C_{10}$ unsaturated $\alpha$-olefin monomers, $C_2$ to $C_5$ $\alpha$-olefin monomers and polyene monomers and an effective amount of photoactive cross-linking agent to cross-link composition upon radiation from a source of active radiation.

20 Claims, No Drawings

RADIATION-CURABLE POLY(α-OLEFIN) ADHESIVES CONTAINING PENDANT OLEFINIC FUNTIONALITY

FIELD OF THE INVENTION

This invention relates to poly(α-olefin) compositions having enhanced radiation curability to provide adhesives having a superior balance of peel adhesion and cohesive strength at elevated temperatures as well as at room temperature.

BACKGROUND OF THE INVENTION

A continuing need in the pressure-sensitive adhesive (PSA) art is the achievement of better control over various mechanical and process properties so that adhesives can be "tailor-made" for specific, highly demanding end-use applications such as packaging, medical, and masking tapes. These applications require a proper balance of properties, and this balance changes with the particular end-use.

Among the earliest polymers to provide a reasonable balance of the properties required for satisfactory PSA performance were the natural and synthetic rubbers. However, these PSAs had poor aging properties, and the art quickly recognized the need to eliminate ethylenically unsaturated groups from the polymer backbone of rubber adhesives in order to improve their oxidative stability.

With the discovery of Ziegler-Natta (ZN) catalysts, it became possible to polymerize α-olefin monomers to high molecular weight. The homopolymers of the $C_6$–$C_{10}$ α-olefins were naturally tacky and therefore good candidates for PSAs since they also had low toxicity, good aging and favorable environmental stability (i.e., low oxidation). These homopolymers were chemically inert, resistant to plasticizer migration, and relatively inexpensive. They, however, had poor cohesive strength and therefore, lacked the shear adhesion necessary for high performance PSAs.

Use of ZN catalysts to make homopolymers from α-olefin monomers, and to make copolymers from mixtures of α-olefin and nonconjugated polyene monomers is known in the art and is succinctly summarized in Odian, G., "Principles of Polymerization", Ch. 8.4 (Second Edition J. Wiley & Sons, New York, 1981). For a more detailed discussion of the polymerization of α-olefins, see Boor, J., "Ziegler-Natta Catalysts and Polymerizations", Ch. 19 (Academic Press, New York, 1979).

Adhesives derived primarily from $C_6$ or higher α-olefins are also known. U.S. Pat. No. 3,542,717 describes poly(α-olefin) adhesive compositions comprising mixtures of polyolefin copolymers derived from olefin monomers with different molecular weights (i.e., copolymers from an α-olefin monomer having 11–20 carbon atoms and a different α-olefin monomer having 4–20 carbon atoms).

U.S. Pat. No. 3,635,755 describes polyolefin PSAs suitable for use as a single component PSAs for surgical tapes that are substantially non-allergenic. Such adhesives can be made from homopolymers of the $C_6$ to $C_{11}$ α-olefins or from inter-polymers of $C_2$ to $C_{16}$ α-olefins having an intrinsic viscosity of 1.5 to 7.0, a Williams plasticity of 0.8 to 4.0, and an acetone/heptane soluble fraction of less than 25% by weight. This patent does not teach that its polyolefin compounds are radiation curable.

U.S. Pat. Nos. 3,954,697 and 4,072,812 describe hot melt adhesives based respectively on propylene/$C_6$–$C_{10}$ 1-olefins wherein the $C_6$–$C_{10}$ 1-olefins comprise 40 to 60 mole percent of the composition and 1-butene/$C_6$–$C_{10}$ 1-olefins wherein the $C_6$–$C_{10}$ 1-olefins comprise 40 to 60 mole percent of the composition. These compositions have no detectable crystallinity by DSC (differential scanning calobrimetry). These two patents also teach that copolymers containing only minor amounts of propylene or butylene (e.g. 5–20 wt %) are permanently tacky. Moreover, they teach that copolymers containing only minor amounts of propylene or butylene have little static shear and fail in the static shear test after less than 100 minutes. In addition, neither patent teaches the use of polyene monomers.

U.S. Pat. No. 4,178,272 describes hot melt adhesives based on a blend of poly (propylene-co-higher 1-olefin) containing 35 to 65 mole percent higher 1-olefin. In addition, tackifying resin and crystalline polypropylene are added. Without the crystalline polypropylene homopolymer, the adhesive exhibits excessive creep under load.

U.S. Pat. No. 4,259,470 describes hot melt adhesives containing propylene, 1-butene or 1-pentene and 3 to 14 mole percent of at least one $C_6$–$C_{10}$ linear α-olefin. Tackifying resins and plasticizing oils are also added to the hot-melt compositions.

U.S. Pat. No. 4,288,358 describes hot-melt adhesive compositions containing terpolymers of 10 to 55 mole percent propylene, 15 to 60 mole percent 1-butene or 1-pentene and 5 to 39 mole percent higher 1-olefins, i.e., $C_6$–$C_{10}$ α-olefins. Tackifying resins and plasticizing oils are also added to the hot-melt compositions.

U.S. Pat. No. 5,112,882 describes a radiation curable poly (α-olefin)-containing adhesive composition that is pressure-sensitive at room temperature which upon cure yields an adhesive film having superior balance of peel and shear adhesion. The adhesive composition comprises (a) $C_6$ to $C_{10}$ α-olefin monomer and 0 to 15 mole percent of polyene monomers and (b) sufficient photoactive cross-linking agent to cross-link the composition upon irradiation. Sufficient radiation energy to generate free radicals is required to cross-link the composition.

SUMMARY OF THE INVENTION

The present invention provides radiation curable poly(α-olefin) adhesive compositions with enhanced curability to adhesive films that have a superior balance of peel adhesion and cohesive strength at elevated temperatures comprising:
 a. an α-olefin polymer comprising about 45 to about 98 mole percent of an ethanediyl repeat unit having a pendent hydrocarbyl group having 4 to 8 carbon atoms, from about 1 to about 40 mole percent of an ethanediyl repeat unit selected from ethylene or units having a pendent hydrocarbyl group having 1–3 carbon atoms, and from about 1 to about 15 mole percent of an ethanediyl repeat unit comprising an ethylenically unsaturated group; and
 b. an effective amount of a photoactive cross-linking agent to cross-link the composition upon radiation from a source of actinic radiation.

Compositions with improved PSA properties may be obtained by blending two or more polymers of the invention or by blending one or more polymers with tackifying resins. Preferably, 100 parts by weight polymer is blended with 1 to 150 parts by weight of a tackifying resin.

The adhesives of the invention can be applied to appropriate substrate surfaces by a wide range of processes, i.e., solution coating, solution spraying, hot-melt extrusion, emulsion coating, etc., to make adhesive tapes, adhesive transfer films, and the like.

As used in this invention:

"$C_6$ to $C_{10}$ α-olefin monomer" means a linear or branched hydrocarbon having 6 to 10 carbon atoms and one terminal ethylenically-unsaturated group and no other functional group;

"Polymer" means a homopolymer, a copolymer, a terpolymer, or a tetrapolymer: polymers derived from more than one monomer may be either random or block polymers;

"polyene monomer" means a hydrocarbon of five or more carbon atoms containing two or more non-conjugated ethylenically unsaturated groups which may also contain 1 to 5 unitary heteroatoms selected from the group consisting of oxygen and silicon;

"photoactive cross-linking agent" means a compound which, under the influence of suitable actinic radiation, initiates free radical formation and subsequent inter-chain cross-linking and which may or may not become incorporated therein, thus increasing the cohesive strength of the adhesive.

DETAILED DESCRIPTION OF PREFERRED EMBODIMENTS

The ethylenically-unsaturated α-olefin polymer of the PSA composition has the formula:

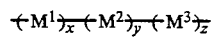  I wherein:

x, y, and z are numbers designating the relative molar amounts of $M^1$, $M^2$, and $M^3$ units that are randomly located in the backbone chain of the polymer such that the polymer has a weight average molecular weight in the range of 50,000 to 3.5 million, x is at least 45 mole percent of (x+y), y is from about 1 to 40 mole percent of (x+y), and z is 0.1 to 15 mole percent of (x+y+z);

$M^1$, is an ethanediyl repeat unit having a pendent hydrocarbyl group having 4 to 8 carbon atoms;

$M^2$ is different from $M^1$ and is an ethanediyl repeat unit selected from ethylene or units having a pendent hydrocarbyl group selected from linear and branched alkyl groups having 1 to 3 carbon atoms.

$M^3$ is an ethanediyl repeat unit having a pendent, non-conjugated ethylenically-unsaturated aliphatic or aryl group selected from the group consisting of 1) linear and branched mono- and polyethylenically-unsaturated hydrocarbyl groups having 3 to 18 carbon atoms, 2) aryl groups substituted by mono- or polyethylenically-unsaturated groups having a total of 7 to 18 carbon atoms, and 3) cycloalkylene groups having 6 to 18 carbon atoms wherein the cyclic group has at least 6 carbon atoms in the ring, provided that the ethylenically-unsaturated (C=C) moiety is not bonded directly to a backbone carbon atom.

Most preferably, the ethylenically-unsaturated α-olefin random polymers have the formula:

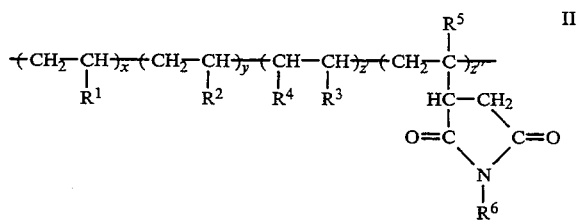

wherein x, y, z' and z" are numbers designating the relative molar amounts of monomer units comprising the backbone chain of the polymer such that the polymer has a weight average molecular weight in the range of 50,000 to 3.5 million, x is at least 45 mole percent of (x+y), y is about 1–40 mole percent of the sum (x+y), and (z'+z") is 0.1 to 15 mole percent of (x+y+z'+z") and either of z' or z" can be zero; z of Formula I equals the sum of (z'+z") of Formula II;

$R^1$ is an alkyl group having 4 to 8 carbon atoms, preferably 4 to 6 atoms;

$R^2$ is hydrogen or a hydrocarbyl group, preferably selected from linear and branched alkyl groups having 1 to 3 carbon atoms;

$R^3$ is an unsaturated aliphatic hydrocarbyl group having 3 to 18 carbon atoms, the unsaturated group of which is separated from the

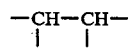

of the α-olefin polymer backbone by at least one carbon atom, preferably selected from linear and branched alkenyl groups having 3 to 18 carbon atoms, non-conjugated polyethylenically-unsaturated aliphatic groups having 6 to 18 carbon atoms, cyclic alkenyl groups having 5 to 18 carbon atoms, and cyclic non-conjugated polyethylenically-unsaturated groups having 6 to 18 carbon atoms, or $R^3$ can also be —Q—$R^7$, wherein $R^7$ is a $C_2$ to $C_{10}$ monovalent hydrocarbyl group containing one or more ethylenically unsaturated groups and Q is a divalent radical, —O—, or

wherein $R^8$ and $R^9$ are the same or different $C_1$ to $C_{12}$ monovalent organic groups selected from alkyl, cycloalkyl, alkaryl, alkoxy, and aryloxy groups; and $R^4$ is hydrogen or $R^4$ together with $R^3$ and the carbon atoms to which they are attached forms an unsaturated or non-conjugated polyunsaturated monocyclic ring system having 6 to 18 carbon atoms, the unsaturated groups of which are separated from the

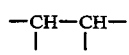

of the α-olefin polymer backbone by at least one carbon atom;

R⁵ is hydrogen or a linear or branched alkyl group having 1 to 18 carbon atoms or cyclic alkyl group having 5 to 18 carbon atoms; and R⁶ is a linear or branched ethylenically- or non-conjugated polyethylenically-unsaturated aliphatic hydrocarbon group having 3 to 18 carbon atoms, or a cyclic ethylenically or non-conjugated polyethylenically-unsaturated aliphatic hydrocarbyl group having 5 to 18 carbon atoms.

It is to be understood that the α-olefin polymers of the invention have terminating groups, the identity of which depends upon the catalyst and components in the polymerizing composition. The terminating groups, because of their insignificant concentration, do not affect the essential properties of the polymers.

When R¹ contains from 4 to 8 carbon atoms, the ethylenically-unsaturated α-olefin polymers are tacky PSAs at room temperatures (20° to 25° C.).

Preferably, the ethylenically-unsaturated α-olefin polymer has a $T_g$ not higher than 0° C., more preferably not higher than about −10° C. Indeed, its $T_g$ can be as low as −70° C. PSA cross-linked α-olefin polymers of the present invention that have low $T_g$'s tend to have superior adhesion. Furthermore, a cross-linked α-olefin polymer with a lower $T_g$ can be blended with larger amounts of tackifying resin to make coatings that exhibit less shocky peel adhesion.

The ethylenically-unsaturated α-olefin polymers have inherent viscosities ("IV") in the range of 0.5 to 5 dl/g (deciliter/gm) at concentrations of 0.5 gm/deciliter in toluene and at 25° C., preferably in the range of 0.5 to 4 dl/g, which values roughly correspond to average molecular weights of from 50,000 to 2,500,000, preferably 50,000 to 2,000,000, respectively. At an IV substantially below that preferred range, the ethylenically-unsaturated α-olefin polymer can be less likely to attain high internal or cohesive strength, especially at elevated temperatures. At viscosities substantially higher than 4 dl/g, the ethylenically-unsaturated α-olefin polymers preferably are coated from solution or hot melt extrusion.

The ethylenically-unsaturated α-olefin polymer can be produced by the following methods. In a first method, a C₆ to C₁₀ α-olefin monomer is polymerized with a C₂–C₅ α-olefin monomer and a non-conjugated polyene selected from 1) a linear or branched polyene having 5 to 18 carbon atoms, 2) a monocyclic polyene having 6 to 20 or more carbon atoms, or 3) a polycyclic polyene having 7 to 20 or more carbon atoms, using a Z-N catalyst to produce a terpolymer containing ethylenic unsaturation. In the terpolymer produced by this first method, M³ of formula I, has, for example, structures such as III, IV and V (below) when the diene is linear, and structures such as VI, VII, and VIII (below) when the diene is cyclic,

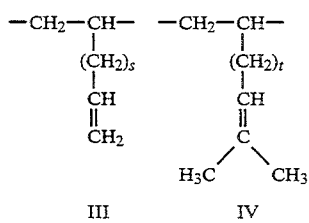

III IV

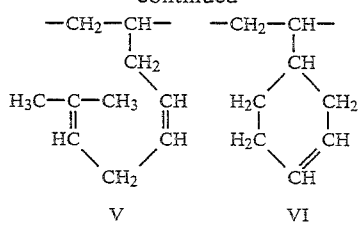

V VI

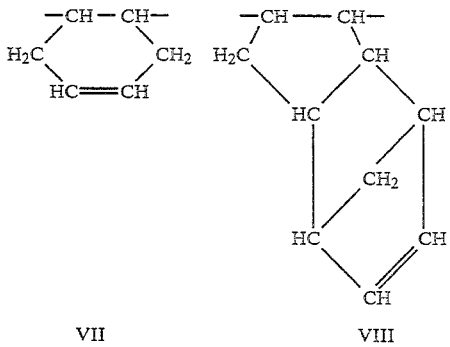

VII VIII wherein s is an integer from 1 to 14, preferably 2 to 4, and t is an integer from 1 to 14, preferably 2 to 4.

A second method involves the steps of:
a. polymerizing a C₆ to C₁₀ α-olefin monomer with at least one lower α-olefin monomer using a Z-N catalyst to produce a saturated homopolymer or a copolymer,
b. reacting the resulting α-olefin polymer with maleic anhydride in the presence of an initiator such as a peroxide and preferably an electron donor (e.g., triphenyl phosphite or triethyl phosphate) to produce a maleated α-olefin polymer adduct, and
c. reacting the maleated α-olefin polymer adduct with an ethylenically-unsaturated primary amine or isocyanate having 3 to 20 carbon atoms, either in solution or in a melt, (e.g., in an extruder) to produce an ethylenically-unsaturated α-olefin polymer.

In the resulting α-olefin polymer, M³ of Formula I has structures such as IX and X.

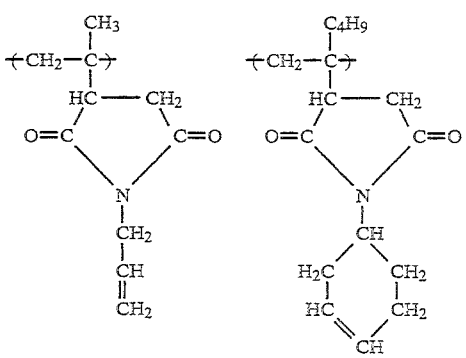

IX X

Alpha-olefins that can be used in the preparation of the ethylenically-unsaturated α-olefin polymers of the invention can have from 2 to 20 carbon atoms. Representative examples include, but are not limited to, ethylene, propylene, 1-butene, 1-pentene, 1-hexene, 1-heptene, 1-octene, and 1-tetradecene; branched olefins such as 3-methyl-1-butene, 3,3-dimethyl-1-butene, 4-methyl- 1-pentene, and 3-ethyl-1-pentene; cyclic olefins such as cyclopentene, cyclohexene, 3-methylcyclopentene, 4-n-butylcyclohexene, bicyclo[2.2.1]hept-2-ene, 1,7,7-trimethylbicyclo[2.2.1]hept-2-ene (bornylene) bicyclo[3.2.0]hept-2-ene, bicyclo[3.2.0]hept-6-ene, bicyclo[2.2.2]oct-2-ene, and bicyclo[3.2.2]non-6-ene; and aromatic olefins such as allylbenzene, 1H-indene, 3-methyl-1H-indene, and styrene.

Non-conjugated dienes that can be used in the preparation of the α-olefin polymers of the invention have 5 to 20 carbon atoms. Representative examples include, but are not limited to, 1,4-pentadiene, 1,5-hexadiene, 1,6-heptadiene, 1,7-octadiene, and 1,13-tetradecadiene; cyclic dienes such as 1,4-cyclohexadiene, bicyclo[2.2.1]hept-2,5-diene, bicyclo[2.2.2]oct-2,5-diene, bicyclo[2.2.2]oct-2,6-diene, 1,7,7-trimethylbicyclo[2.2.1]hept-2,5-diene, 5-allylbicyclo[2.2.1]hept-2-ene, and 1,5-cyclooctadiene; and aromatic dienes such as bis(ω-alkenyl)benzenes such as 1,4-diallylbenzene, and 4-allyl-1H-indene.

The α-olefin polymers of the present invention can be either random co-, ter-, tetra-polymers; or blocks of homopoly(α-olefins) interspersed with polyene units, depending upon the relative reactivities of the various monomers. When the reactivity at each end of the alpha, omega dienes are about equal, gel-permeation chromatographic analysis (with low-angle light scattering detector) of polymers containing these monomers show more branching than observed with monomers having double bonds of unequal reactivity. When diene monomers in which the reactivities of the double bonds are unequal are polymerized, as is the case with 7-octenyldimethylvinylsilane, essentially linear polymers are formed during ZN polymerization.

It is preferred that the unsaturated α-olefin polymers of the present invention have a glass transition temperature (Tg) in the range of from about $-70°$ C. to about $0°$ C. and more preferably, in the range of from about $-60°$ C. to about $-10°$ C. It is also preferred that the inherent viscosity of the unsaturated copolymers range from about 0.5 to about 9.0 dl/g. More preferably, the inherent viscosity should range from about 0.5 to about 6.0 dl/g. The number average molecular weights of the copolymers should be in the range of 50,000 to 5,000,000. It is preferred that the number average molecular weights be in the range from about 50,000 to about 3,000,000.

The α-olefin and polyene monomers can be polymerized in the presence of Ziegler-Natta catalysts over a wide range of temperatures, e.g. $0°$ to $140°$ C., preferably $30°$ to $90°$ C. The polymerization can be done in bulk or in inert solvents. Suitable examples of inert solvents include, but are not limited to, the aliphatic, aromatic, and cycloaliphatic hydrocarbon solvents, i.e., pentane, hexane, heptane, benzene, toluene, cyclopentane, and cyclohexane. The amount of catalyst used is preferably in the range of 0.1 g to 5 g per Kg of monomer, more preferably 0.2 to 3 g per Kg of monomer, and most preferably, 0.5 to 2 g per Kg of monomer. ZN catalysts are well known in the art and are disclosed, for example, in Odian, G., supra. and Boor, J., supra.

Suitable photo cross-linking agents for use in the compositions of the invention, which are free of elemental sulfur include, but are not limited to: aldehydes, such as benzaldehyde, acetaldehyde, and their substituted derivatives; ketones such as acetophenone, benzophenone and their substituted derivatives such as Sandoray ™ 1000 (Sandoz Chemicals, Inc., Charlotte, N.C.); quinones such as the benzoquinones, anthraquinone and their substituted derivatives; thioxanthones such as 2-isopropylthioxanthone and 2-dodecylthioxanthone; and certain chromophore-substituted vinyl halomethyl-symtriazines such as 2,4-bis-(trichloromethyl)-6-(3′,4′-dimethoxyphenyl)-sym-triazine. The concentration of photoactive cross-linking agent can be present in the range of 0.05 to 6.0 percent by weight, preferably 0.1 to 2 percent by weight of the polymer, and more preferably 0.5 to 1.5 percent by weight.

The adhesive composition of the present invention can be coated from solution by any coating processes well known in the art, such as knife coating, roll coating, gravure coating, curtain coating, etc. Useful coating thicknesses for the present invention are in the range of 0 5 to 15 mg/cm$^2$, preferably in the range of 2.0 to 7.0 mg/cm$^2$. Furthermore, some of the compositions of the invention can be applied by extrusion coating with no solvent present thereby eliminating environmental and toxicity problems associated with solution coating processes.

In addition, the adhesive composition can be cured using a source of actinic radiation of sufficient energy (i.e., wavelength range) to generate free radicals when incident upon the particular photoactive cross-linking agent selected for use in the composition. The preferable wavelength range for the photoactive cross-linking agents disclosed above is 400 to 250 nm. The radiant energy in this preferred range of wavelengths required to cross-link the adhesive film of the invention is 100 to 1500 mJ/cm$^2$ (millijoules/cm$^2$) and more preferably 200 to 800 mJ/cm$^2$. Details of the photocure process are disclosed in U.S. Pat. Nos. 4,181,752 and 4,329,384 and are incorporated herein by reference.

The cross-linked adhesive films preferably have a gel content in the range of from 2 to 95 weight percent, more preferably from 30 to 80 weight percent, and most preferably from 50 to 70 weight percent when the gel content has been corrected for soluble tackifying resins and other additives as hereinafter described.

The addition of one or more tackifying resins to the inventive composition can provide a PSA having improved tack, lower viscosity, improved coatability, good heat stability, and improved peel adhesion. The shear adhesion of the tackified compositions can be enhanced by radiation cure with no loss of peel adhesion. The resulting adhesives have the high internal or cohesive strength required for box sealing tape or masking tape applications.

Compatible tackifying resins useful in the radiation curable adhesive compositions of the invention include resins derived by polymerization of C$_5$ to C$_9$ unsaturated hydro-carbon monomers, polyterpenes, synthetic polyterpenes, and the like. Hydrocarbon tackifying resins can be prepared by polymerization of monomers consisting primarily of olefins and diolefins and include, for example, residual by-product monomers of the isoprene manufacturing process. These hydrocarbon tackifying resins typically exhibit Ball and Ring Softening Points (ASTM D465-59) of from about $80°$ C. to about $145°$ C.; acid numbers of from about 0 to 2, and saponification values of less than one.

Examples of such commercially available resins based on a C$_5$–C$_9$ olefin fraction of this type are Wingtack ™ 95, Wingtack™ 115 and Wingtack ™ Plus tackifying resins available from Goodyear Tire and Rubber Co. Other hydrocarbon resins include Regalrez ™ 1078 and Regalrez ™ 1126 available from Hercules Chemical Co. Inc., Wilmington, Del.; Arkon resins, such as Arkon ™ P115, available from Arakawa Forest Chemical Industries, Chicago Ill.; and Escorez ™ resins available from Exxon Chemical Co.

Other suitable resins include the terpene polymers, such as polymeric resinous materials obtained by polymerization and/or copolymerization of terpene hydrocarbons such as their mixtures, including carene, isomerized pinene, terpinene, terpentene, and various other terpenes. Commerically available resins of the terpene type include the Zonarez ™ terpene B-series and 7000 series available from the Arizona Chemical Corp., Wayne, N.J. 07470. Typical properties reported for the Zonarez ™ terpene resins include Ball and Ring Softening of less than one, and Saponification Numbers (ASTM D464-59) of less than one. The terpene resin used in examples below is a poly(beta-pinene) resin, Piccolyte ™ A115 available from Hercules Chemical Co. Inc., which has a Ball and Ring Softening Point of 115° C., an Acid Number 4 of one, and Iodine Number 4 of 190.

The tackifying resins may contain ethylenic unsaturation; however, saturated tackifying resins are preferred for those applications where oxidation resistance is important. The total amount of tackifying resins in the composition ranges up to about 150 parts, more preferably 5 to 50 parts, and most preferably 25 to 35 parts by weight per 100 parts of polymer. Saturated tackifying resins such as Regalrez ™ 1078 and Arkon ™ P115 are preferred because they yield a higher gel content upon equivalent treatment by an activated cross-linking agent.

Minor amounts of additives can also be included in the composition to provide adhesives for special end uses. Such additives may include pigments, dyes, plasticizers, fillers, stabilizers, ultraviolet absorbers, anti-oxidants, processing oils, and the like. Amount of additives used can vary from 0.1 to 50 weight percent depending on the end use desired.

The adhesive composition of the present invention can be coated onto a wide range of substrate materials, examples being polymer films such as polyethylene terephthalate (PET), and biaxially oriented polypropylene (BOPP); woven and non-woven fabrics; metals and metal foils such as aluminum, copper, lead, gold and the like; paper; glass; ceramics; and composite materials comprised of laminates of one or more of these materials.

The present invention provides α-olefin polymers containing adhesive compositions that are radiation-curable to yield adhesive films with an improved balance of peel adhesion and cohesive strength, especially at elevated temperatures. The peel adhesion and cohesive strength values are capable of being varied independently to achieve desired values. Adhesive films of the invention preferably have peel values in the range of 2 to 100 N/dm and shear values in the range of 1 to 10,000 or more minutes.

The present invention provides pressure-sensitive adhesives which have good cohesive strength at elevated temperatures. The PSA tapes of the invention are ideally suited for automotive masking tape applications as well as other tape applications which require good cohesive strength at elevated temperatures and yet be readily removed from painted or other surfaces leaving essentially no adhesive residue.

Another embodiment of the invention comprises a laminated structure of at least a first and a second substrate, the substrates being joined by a layer of the adhesive composition of the invention. At least one of the substrates is capable of transmitting actinic or electron beam radiation so that the adhesive film may be cured.

In some applications primers may be useful for improving the adhesion of the adhesive to some substrates. Useful primers for the practice of the present invention include a triblock copolymer of styrene-ethylene/butylene-styrene grafted with maleic anhydride (Kraton ™ G-1901X, Shell Chemical Co.) and a combination of amorphous polypropylene and Kraton ™ G-1901X Release liners (such as described in U.S. Pat. Nos. 4,386,135, 3,957,724, and 2,532,011) form a special class of substrates on which the composition of the invention can be coated and subsequently radiation cured to form adhesive transfer films.

TEST METHODS

The test procedures used in the examples to evaluate and compare the properties of the PSA compositions and tapes made from them are industry standard tests. These tests are described in detail in various publications of the American Society for Testing Materials (ASTM), Philadelphia, Pa. and the Pressure Sensitive Tape Council (PSTC), Glenview, Ill. References to these standards are also given:

Shear Strength (ASTM D-3654-78; PSTC-7)

Shear strength is a measure of the cohesiveness or internal strength of an adhesive. It is based upon the amount of force required to pull an adhesive strip from a standard flat surface in a direction parallel to the surface to which it has been affixed with a definite pressure. It is measured in units of time(minutes) required to pull a standard area of PSA coated sheet material from a stainless steel test panel under stress of a constant, standard load.

The tests were conducted on adhesive coated strips applied to a stainless steel panel such that a 12.7 mm by 12.7 mm portion of each strip was in firm contact with the panel with one end portion of the tape being free. The panel with coated strip attached was held in a rack such that the coated surface of the panel forms an angle of 182° with the vertical tape free end which is then tensioned by application of a force of one kilogram applied as a hanging weight from the free end of the coated strip. The 182° angle is used to negate peel forces thus insuring that only the shear forces are measured, thereby more accurately determining the holding power of the tape being tested. The time elapsed for each test specimen to separate from the steel panel is recorded as the shear strength.

Mode of Failure (MOF)

The time at which the mass falls is called "Shear Test" and is reported as "5000+" if the tape has not failed after 5000 minutes. With each Shear is indicated the mode of failure as follows:

po=pop-off, i.e., 75–100% adhesive failure from steelplate:

f=cohesive failure both surfaces completely covered by adhesive;

The pop-off failure mode is preferred because it is indicative of adhesive failure of the adhesive/steel interfacial bond as opposed to cohesive failure of the adhesive. Adhesives of various shear adhesions, all within the range of the present invention (1–10,000 minutes), are preferred depending on end-use applications.

Two specimens of each tape were tested and the shear tests were averaged to obtain the shear value.

Peel Adhesion [ASTM D 3330-78; PSTC-1(11/75)]

Peel adhesion is the force required to remove a PSA coated test specimen from a test panel measured at a specific angle and rate of removal. In the examples, this force is expressed in Newtons per decimeter (N/dm) width of coated sheet. The procedure followed is:

(1) A 25.4 mm×150 mm test specimen was applied to a horizontally positioned clean glass test plate such that 12.7 mm of the specimen extended beyond the edge of the plate. A 2.3 kg rubber roller was rolled over the test specimen twice to insure good contact between the specimen and the test plate.

(2) The free end of the specimen is doubled back nearly touching itself so the angle of removal is 180°. The free end is attached to the adhesion tester scale.

(3) The glass test plate is clamped in the jaws of tensile testing machine which is capable of moving the plate away from the scale at a constant rate of 2.3 meters per minute.

(4) The scale reading in Newtons is recorded as the tape is peeled from the glass surface.

Inherent Viscosity [ASTM D 2857-70 (Reapproved 1977)]

In order to understand the benefits derived from the teaching of this invention, it is necessary to relate the improvements in shear strength and processability to the molecular weight of the PSA. The inherent viscosity of 10 ml sample of a 0.5 g/dl solution of the PSA is measured using a Cannon-Fenske #50 viscometer in a water bath controlled at 25° C. The solvent used is specified in the examples.

Percent Gel Test [ASTM D 3616-82]

The percent gel is used as an indication of cure level. The tapes containing tackifying resins are corrected to the actual percent gel. The corrected percent gel is 100 times the gelled mass divided by the total mass of material that is capable of forming a gelled network. Soluble materials such as tackifiers are subtracted out when determining the gel fraction. Cross-linking by radiation improves the creep and shear resistance of pressure-sensitive adhesives.

Many important properties of cross-linked pressure-sensitive adhesives vary with the gel content. Hence, determination of the gel content provides a means for controlling the process and thereby raising the quality of the tape.

Extraction tests permit verification of the proper gel content of polyolefin PSAs and they also permit comparison between different cross-linked adhesives and their specific end uses.

Gel Content Determination

A square test specimen (3.81 cm×3.81 cm) containing approximately 0.06 g of PSA is cut from the tape and placed in a 120-mesh stainless steel basket measuring approximately 4.4×4.4.×1.3 cm. The contents are weighed to the nearest 0.1 mg and then immersed in a capped beaker containing sufficient toluene to cover the specimen. After extraction for 24 to 48 hours, the basket (containing the specimen) is removed, drained, and placed in an oven at 93° C. The basket and specimen are dried to a constant weight and the gel content is determined as follows:

$$\text{Extract \%} = \frac{\text{weight lost during extraction} \times 100}{\text{(weight of original specimen)}}$$

$$\text{Gel Content} = 100 - \text{percent extract}$$

The gel content of the adhesive was determined after correcting for tackifier

Two specimens of each tape were tested and the results were averaged to obtain the gel content value.

Percent Residue Test

An aluminum panel painted with an automotive basecoat/clearcoat (BC/CC) acrylic enamel paint system or the automotive 50J TM acrylic enamel paint of Ford Motor Co. was used as a test panel for the percent residue test.

Tapes were applied at room temperature to the test surface, followed by rolling the test specimen with two passes of a 4.5-pound (2-kg) rubber-coated metal roller. After one hour in an air-circulating oven at either 121° C. or 150° C., the tape was peeled back, while hot, at an angle of 135° at an approximate rate of 1.9 m/min. across half of the panel. Thereafter, the test panel was allowed to cool to room temperature and the tape samples peeled from the remainder of the test panel at an angle of 135° and a rate of approximately 1.9 m/min. The panel was then visually examined for any adhesive residue. Resides greater than 5% exceed preferred performance requirements.

This invention is further illustrated by the following examples of preferred embodiments thereof, although it will be understood that these examples are included merely for purposes of illustration and are not intended to limit the scope of the invention unless otherwise specifically indicated.

Unsaturated α-olefin copolymers 1-Hexene/-propylene/4-vinylcyclohex-1-ene copolymer (U-1)

A reaction vessel equipped with a mechanical stirrer, reflux condenser and temperature controller was dried and filled with nitrogen. The vessel was charged with 300 ml 1-hexene, 300 ml toluene, 7.5 ml 4-vinylcyclohex-1-ene and 1.1 ml. diethyl aluminum chloride. The reactor was heated to 60° C., 0.21 g Aluminum Activated Reduced titanium trichloride (AATiCl$_3$, Stauffer Chemical, Hartford, Conn.) was introduced, and propylene was bubbled into the reaction mixture at a rate of about 60 cc/min. for 2 hours. Methanol was added to the reaction mixture to terminate the polymerization. The reactor was cooled to room temperature, excess methanol was added to precipitate the polymer and the precipitated polymer was washed twice with methanol.

Reaction product of maleated polyolefin (MPO) and isocyanatoethyl methacrylate (U-2)

52.0 g of 1.2 mole percent maleated hexene/propylene (available from Eastman Chemical Company as TX-P1824-013) (60/40) copolymer having a melt viscosity of 7680 cp at 190° C. was dried in a vacuum at 70° C. (158° F.) for 16 hours and dissolved in 250 ml of toluene. The solution was refluxed under nitrogen, and about 50 ml of toluene was distilled out to ensure recyclization of diacid grafts and to remove residual water in the polymer. 0.63 g of isocyanatoethyl methacrylate (IEM), was added and the reaction mixture gently refluxed for 3 hr. IR analysis showed that all isocyanate groups were consumed indicating completion of the reaction. The copolymer was concentrated to a viscosity suitable for coating on PET backing. (~25 to 30% solids)

Reaction product of MPO and isocyanatoethyl methacrylate (U3)

53 g of 2.6 mole percent maleated hexane/propylene (60/40) copolymer having a melt viscosity of 9840 cp at 190° C. (available from Eastman Chemical Company as TX-1768-85) was dissolved in 250 ml of toluene. The solution was refluxed under nitrogen, and about 50 ml of toluene was distilled to ensure recyclization of the acid grafts and to remove residual water in the polymer. 2.03 g of isocyanatoethyl methacrylate (IEM), was added and the reaction mixture gently refluxed for 3 hr. Progress of the reaction was monitored as described above. The copolymer was concentrated to a viscosity suitable for coating on PET backing. (~25–30 percent solids).

Reaction product of MPO and 4-aminostyrene (U4)

17 g of 4.4 mole percent maleated hexene/propylene (60/40) copolymer having melt viscosity 4700 cp at 190° C. (available from Eastman Chemical Company as TX P1824-011) was dissolved in 150 ml of toluene. The polymer solution was refluxed under nitrogen and about 20 ml of toluene was distilled out to ensure recyclization of the acid grafts and to remove residual water from the polymer. 1.24 g of 4-aminostyrene (PAS) were added and the mixture gently refluxed for 3 hr. Progress of the reaction was monitored as described above. The copolymer was concentrated to a viscosity suitable for coating on PET backing. (~25 to 30% solids).

Reaction product of MPO and 4-aminostyrene (U5)

15 g of 4.4 mole percent maleated hexene/propylene (60/40) copolymer as described in the preparation of U4 was dissolved in 150 ml of toluene. The solution was refluxed under nitrogen to ensure recyclization of the acid grafts and about 20 ml of toluene was distilled out to remove residual water in the polymer. 0.53 g of PAS, was added and reaction mixture gently refluxed for 3 hr. Progress of the reaction was monitored as described above. The copolymer was concentrated to a viscosity suitable for coating on PET backing. (~25 to 30% solids)

Reaction product of MPO and 4-aminostyrene (U6)

16.7 g of 4.4 mole percent maleated hexene/propylene (60/40) copolymer as described in the preparation of U4 was dissolved in 150 ml of toluene. The solution was refluxed under nitrogen, and about 20 ml of toluene was distilled out to ensure recyclization of the acid grafts and to remove residual water in the polymer. 0.30 g of PAS, was added and gently refluxed for 3 hr. Progress of the reaction was monitored as described above. The copolymer was concentrated to a viscosity suitable for coating on PET backing. (~25 to 30% solids)

Reaction product of MPO and allylamine (U7)

27.1 g of 4.4 mole percent maleated hexene/propylene (60/40) copolymer as described in the preparation of U4 was dissolved in 150 ml of toluene. The solution was refluxed under nitrogen to recyclize the acid grafts, and about 20 ml of toluene was distilled out to remove residual water in the polymer. 0.94 g of allyl amine, was added and the reaction mixture gently refluxed for 3 hr. Progress of the reaction was monitored as described above. At the end of the reaction, the copolymer was concentrated to a viscosity suitable for coating on PET backing. (~25 to 30% solids)

EXAMPLES 1–19

Pressure Sensitive Adhesives From Unsaturated Polyolefins

Blends of 100 parts of unsaturated α-olefin copolymers U-1, U-2, U-3, U-4, U-5, U-6, and U-7 with and without 33 phr (parts per 100 parts) by weight of tackifier resin, 1.0 phr of photoinitiator, and 0.25 phr Irganox ™ 1010 in toluene were knife coated to yield a dry adhesive coating thickness of 38 μm on a 57 μm thick biaxially oriented poly(ethylene terephthalate) (PET) film. Each coating was dried for 5 minutes at 70° C. (158° F.) and exposed to doses of 300 to 1200 mJ/cm$^2$ from medium pressure mercury lamps. The compositions prepared and the test results obtained for each are recorded in Table I.

Comparative Examples C1, C2, C3, C4, C5, C6 and C7

Control PSA construction consisted of untackified and uncured samples of the unsaturated α-olefin polymers (U-1, U-2, U-3, U-4, U-5, U-6, and U-7, as previously described) which were solution coated onto a 57 μm biaxially oriented PET film to produce dry PSA films having a nominal thickness of 38 μm. The coating conditions and subsequent test protocol was the same as described for Examples 1–19.

TABLE I

| | Adhesive Compositions with Unsaturated Polyolefins | | | | | | | |
|---|---|---|---|---|---|---|---|---|
| Ex. No. | Unsaturated Copolymer | Tackifier (phr) | UV Exposure mJ/cm$^2$ | Peel N/dm | Gel % | 25° Shear min. (Failure Mode) | % Residue 121° C. | 150° C. |
| 1 | U-1 | 0 | 800 | 19 | 76 | 35 (po$^4$) | 0 | 0 |
| 2 | U-1 | a$^1$ (15) | 800 | 48 | 41 | 305 (po) | 1 | 2 |
| C1 | U-1 | 0 | 0 | 50 | 0 | 20 (f$^5$) | 25 | 25 |
| 3 | U-2 | 0 | 300 | 67 | 38 | 1126 (po) | 5 | 8 |
| 4 | U-2 | a (25) | 300 | 87 | nd | 1144 (po) | — | — |
| 5 | U-2 | b$^2$ (25) | 300 | 97 | nd | 1123 (po) | — | — |
| C2 | U-2 | 0 | 0 | 56 | 0 | 44 (f) | 75 | 100 |
| 6 | U-3 | 0 | 300 | 58 | 32 | 29 (po) | 2 | 5 |
| 7 | U-3 | b (25) | 600 | 60 | 62 | 630 (po) | — | — |
| C3 | U-3 | 0 | 0 | 77 | 0 | 85 (f) | 75 | 100 |
| 8 | U-4 | 0 | 300 | 27 | 63 | 88 (po) | 1 | 1 |
| 9 | U-4 | a (25) | 600 | 34 | 52 | 2340 (f) | — | — |
| 10 | U-4 | b (25) | 600 | 41 | 54 | 2932 (f) | — | — |
| C4 | U-4 | 0 | 0 | 83 | 0 | 30 (f) | 25 | 50 |
| 11 | U-5 | 0 | 600 | 24 | 58 | 123 (po) | — | — |
| 12 | U-5 | a (25) | 300 | 58 | 48 | 1158 (po) | — | — |
| C5 | U-5 | 0 | 0 | 67 | 0 | 65 (f) | 50 | 100 |
| 13 | U-6 | 0 | 300 | 31 | 52 | 1489 (po) | — | — |
| 14 | U-6 | a (25) | 600 | 57 | nd | 1158 (po) | — | — |
| 15 | U-6 | b (25) | 300 | 27 | nd | 7843 (f) | — | — |

TABLE I-continued

| | | Adhesive Compositions with Unsaturated Polyolefins | | | | | | |
|---|---|---|---|---|---|---|---|---|
| Ex. No. | Unsaturated Copolymer | Tackifier (phr) | UV Exposure mJ/cm² | Peel N/dm | Gel % | 25° Shear min. (Failure Mode) | % Residue 121° C. | % Residue 150° C. |
| 16 | U-6 | c³ (25) | 600 | 49 | nd | 653 (po) | — | — |
| C6 | U-6 | 0 | 0 | 64 | 0 | 24 (f) | 50 | 75 |
| 17 | U-7 | 0 | 600 | 58 | nd— | 136 (po) | 0 | 2 |
| 18 | U-7 | b (25) | 600 | 82 | nd | 497 (po) | — | — |
| 19 | U-7 | b (25) | 600 | 73 | nd | 529 (po) | — | — |
| C7 | U-7 | 0 | 0 | 62 | 0 | 92 (f) | 50 | — |

¹a-tackifier is Wingtack ™ Plus
²b-tackifier is Regalrez ™ 1126
³c-tackifier is Arkon ™ P115
⁴po-means pop off
⁵f-means cohesive failure The data in Table I reveals that unsaturated polyolefin PSA compositions containing propylene as the $C_2$ to $C_5$ α-olefin monomer, when irradiated with ultraviolet light, leave less than 5% residue in the Percent Residue test and, particularly, that where the unsaturation is introduced into propylene-containing polyolefin by maleation followed by reaction with an amino or isocyanate group substituted unsaturated compound, that excellent shear values at 25° C. are obtained and less than 5% adhesive residue (in most cases no adhesive residue) is left in the Percent Residue Test. The samples of the comparative examples leave 25% up to 100% adhesive residue.

In summary, novel adhesive compositions have been described. Although specific embodiments and examples have been disclosed herein, it should be borne in mind that these have been provided by way of explanation and illustration and the present invention is not limited thereby. Certainly, modifications which are within the ordinary skill in the art are considered to lie within the scope of this invention as defined by the following claims including all equivalents.

We claim:

1. A composition radiation-curable to an adhesive comprising:
   a) an α-olefin polymer having the general formula:

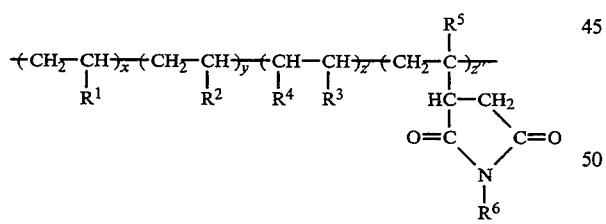

wherein
   x, y, z' and z" are numbers designating the relative molar amounts of monomer units comprising the backbone chain of the polymer such that the polymer has a weight average molecular weight in the range of 50,000 to 3.5 million, x is at least 45 mole percent of (x+y), y is from about 1 to 40 mole percent of (x+y), and (z'+z") is 0.1 to 15 mole percent of (x+y+z'+z") and either of z' or z" can be zero;
   $R^1$ is an alkyl group having 4 to 8 carbon atoms;
   $R^2$ is hydrogen or a hydrocarbyl group;
   $R^3$ is an unsaturated aliphatic hydrocarbyl group having 3 to 18 carbon atoms, the unsaturated group of which is separated from the

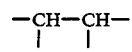

of the α-olefin polymer backbone by at least one carbon atom, preferably selected from linear and branched alkenyl groups having 3 to 18 carbon atoms, non-conjugated polyethylenically-unsaturated aliphatic groups having 6 to 18 carbon atoms, cyclic alkenyl groups having 5 to 18 carbon atoms, and cyclic non-conjugated polyethylenically-unsaturated groups having 6 to 18 carbon atoms, or $R^3$ can also be $-Q-R^7$, wherein $R^7$ is a $C_2$ to $C_{10}$ monovalent hydrocarbyl group containing one or more ethylenically unsaturated groups and Q is a divalent radical, $-O-$, or

wherein $R^8$ and $R^9$ are the same or different $C_1$ to $C_{12}$ monovalent organic groups selected from alkyl, cycloalkyl, alkaryl, alkoxy, and aryloxy groups; and
   $R^4$ is hydrogen or $R^4$, together with $R^3$ and the carbon atoms to which they are attached, forms an unsaturated or non-conjugated polyunsaturated monocyclic ring system having 6 to 18 carbon atoms, the unsaturated groups of which are separated from the

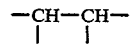

of the α-olefin polymer backbone by at least one carbon atom;
   $R^5$ is hydrogen or a linear or branched alkyl group having 1 to 18 carbon atoms or cyclic alkyl group having 5 to 18 carbon atoms; and
   $R^6$ is a linear or branched ethylenically- or non-conjugated polyethylenically-unsaturated aliphatic hydrocarbon group having 3 to 18 carbon atoms, or a cyclic ethylenically or non-conjugated polyethylenically-unsaturated aliphatic hydrocarbyl group having 5 to 18 carbon atoms; and b) an effective amount of a photoactive crosslinking agent to crosslink the composition upon exposure to a source of actinic radiation.

2. The composition of claim 1 wherein said photoactive cross-linking agent is selected from the group consisting of aldehydes, ketones, quinones, thioxanthones and s-triazines.

3. The composition of claim 1 wherein the concentration of said photoactive cross-linking agent is in the range of 0.05 to 6.0 percent by weight of the polymer.

4. The composition of claim 1 further comprising a tackifying resin.

5. The composition of claim 4 wherein said tackifying resin comprises one or more hydrocarbon resins.

6. The composition of claim 5 wherein said tackifying resin is present in an amount up to about 150 parts per hundred parts of the adhesive composition.

7. The composition of claim 1 further comprising an effective amount of at least one additive selected from the group consisting of pigments, dyes, fillers, plasticizers, stabilizers, antioxidants and processing oils.

8. The composition of claim 1 wherein $R^1$ of said α-olefin polymer has 4 to 6 carbon atoms.

9. The composition of claim 1 wherein $R^2$ of said α-olefin polymer is a linear or branched alkyl group having 1 to 3 carbon atoms.

10. The composition of claim 1 wherein said α-olefin polymer is a tacky pressure sensitive adhesive at 20° to 25° C.

11. The composition of claim 1 wherein said α-olefin polymer has a glass transition temperature of 0° C. or less.

12. The composition of claim 1 wherein said α-olefin polymer has an inherent viscosity at a concentration of 0.5 g/dl and a temperature of 25° C. of between 0.5 and 5 dl/g.

13. The composition of claim 12 wherein said inherent viscosity of said α-olefin polymer is between 0.5 and 4 dl/g.

14. The composition of claim 1 wherein $R^5$ of said α-olefin polymer is a methyl group and wherein $R^6$ is —$CH_2CH\!=\!CH_2$.

15. The composition of claim 1 wherein $R^5$ of said α-olefin polymer is a butyl group and wherein $R^6$ is

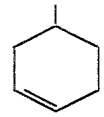

16. The composition of claim 1 wherein said composition has been cross-linked.

17. An article comprising the adhesive composition of claim 1 coated on a substrate.

18. The article of claim 17 wherein the adhesive composition has been cross-linked.

19. The article of claim 18 wherein the adhesive composition has been cross-linked by ultraviolet radiation.

20. The article of claim 18 wherein the adhesive composition has been cross-linked by electron beam irradiation.

* * * * *

UNITED STATES PATENT AND TRADEMARK OFFICE
CERTIFICATE OF CORRECTION

PATENT NO. : 5,407,970
DATED : April 18, 1995
INVENTOR(S) : James R. Peterson, et al It is certified that error appears in the above-indentified patent and that said Letters Patent is hereby corrected as shown below:

Col. 8, line 16   "0 5" should read -- 0.5 --

Col. 15, table I: In Ex. No. 17, under the heading "Gel %" "nd—" should read

-- nd --

Signed and Sealed this

Tenth Day of October, 1995

Attest:

BRUCE LEHMAN

*Attesting Officer*   *Commissioner of Patents and Trademarks*